June 19, 1928.
P. MUELLER ET AL
COUPLING FOR TRAPS
Original Filed Aug. 19, 1920
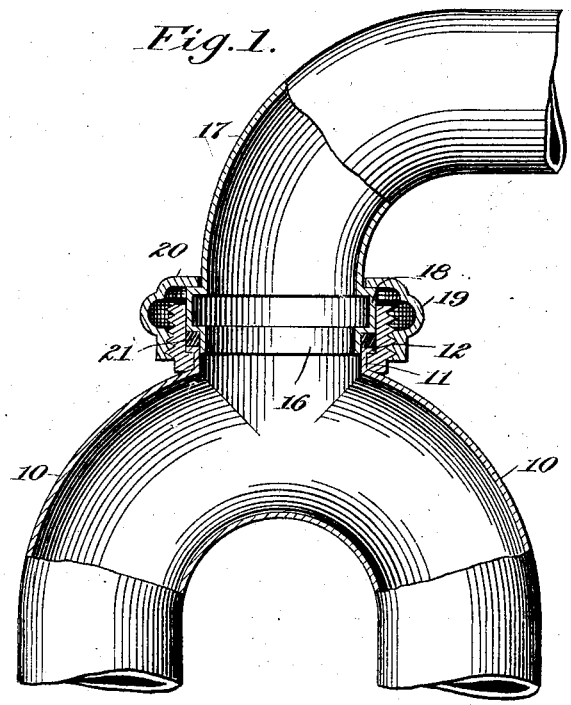
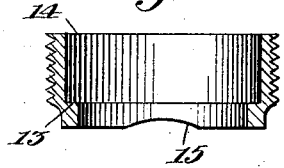
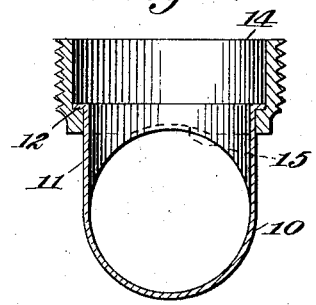
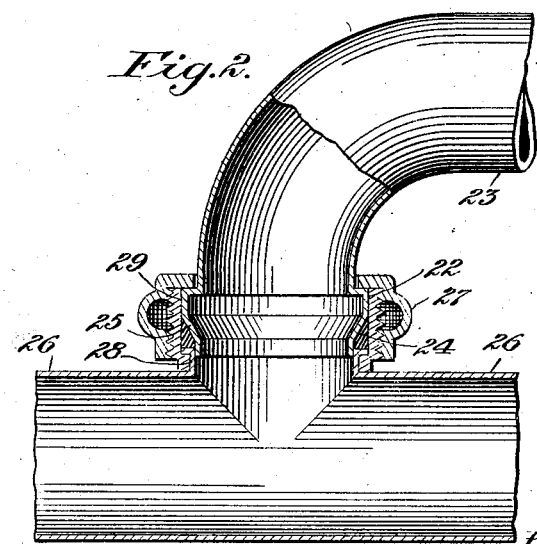
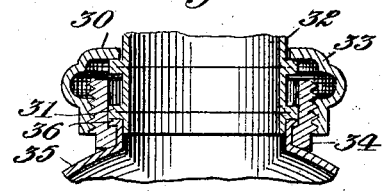
Inventors:
Philip Mueller
Anton C. Schuerman
and Clarence W. Lucas,
By Cushman, Bryant & Darby
Attys.

Patented June 19, 1928.

1,674,562

UNITED STATES PATENT OFFICE.

PHILIP MUELLER AND ANTON C. SCHUERMANN, OF DECATUR, AND CLARENCE W. LUCAS, OF CHICAGO, ILLINOIS, ASSIGNORS TO ADOLPH MUELLER, TRUSTEE, OF DECATUR, ILLINOIS.

COUPLING FOR TRAPS.

Original application filed August 19, 1920, Serial No. 404,539. Divided and this application filed February 28, 1925. Serial No. 12,365.

This invention relates to couplings and more particularly to a detachable connection adapted to be employed with the vents of trap sections, but which may readily be used with the other pipe connections and similar fittings. The invention is a division of the subject matter of application for Patent No. 1,533,886, issued April 14, 1925, and has been made the subject of a separate application under official requirement.

The essential features of the present development reside in the provision of a solderless vent coupling formed by spinning outwardly from a wall of one of the pipe sections an open vent stub to which may be suitably secured a bushing or equivalent element, while the other of the pipe sections is formed with a complementary part, such as an outwardly projecting flange adapted to provide a metal-to-metal joint.

Preferably, although not necessarily, a packing will be interposed between the meeting joint so as to insure a fluid and gas tight connection when the coupling nut or equivalent securing means, which is mounted on one of the pipe sections, is actuated, and the parts drawn together. Heretofore, it has been a serious and difficult problem to obtain a suitable solderless vent coupling for traps of this particular type, since the vent connection has to be formed in a wall of one of the pipe sections, which is necessarily limited in area, due to the small amount of metal that is available for permitting an integral projection to be spun out of the pipe wall.

It is, therefore, the primary purpose of the present invention, to provide a solderless connection that is particularly adapted for effectively and expeditiously securing the thin pipe sections, particularly of vent couplings, together in such a manner, that will eliminate the expensive and specialized fittings that are usually employed in such installations. Furthermore, the present development relates to details of construction by means of which a solderless vent coupling is provided which will give a secure water and gas tight joint, entirely free from the corrosive effects of solder, and so arranged as to eliminate the possibility of the interstices or projections becoming clogged with foreign material that would tend to decrease the life of the coupling.

In the drawings, Figure 1 is a sectional view of a vent connection for a curved trap section, embodying our invention, Figure 2 is a sectional view of a vent connection for a straight trap section.

Figure 3 is a detail sectional view of the bushing employed for making the connection.

Figure 4 is a sectional view at substantially right angles to the view in Figure 1, with the upper pipe section removed.

Figure 5 is a sectional view showing a modified form of connection.

Referring to the drawings, wherein like numerals indicate corresponding parts in the various figures, and more particularly to Figure 1, 10 denotes a thin curved pipe trap section having a vent aperture formed in its outer wall at substantially right angles to the horizontal axis of the pipe. This vent is formed by spinning out the pipe-like projection 11, the end of which is adapted to be flanged down, as at 12, into interlocking relation with the inwardly projecting collar 13 of the threaded bushing 14. By this construction, the small amount of metal which it is possible to spin out to form the projection 11, will be sufficient to provide the flange 12 to engage the collar 13 and lock the bushing 14 in place, and since the body of the bushing extends an appreciable distance upward from the collar 13, which is gripped by the flange, sufficient threaded surface is provided to insure a secure locking connection to be engaged by a coupling nut or its equivalent.

In order to lock the bushing 14 in place, and hold it against angular movement on the vent projection 11, it is preferably formed with a curved seat 15 on its under side, two being shown in the present example, adapted to engage the curved surface of the pipe 10 on each side of the projection 11, so that when the flange 12 is bent down and secured to the collar 13, the bushing, by reason of the engagement of the curved seats 15 with the correspondingly curved portions of the pipe 10, will be further locked against rotation or angular movement.

The collar 13 of the bushing is preferably knurled or serrated at its inner periphery so that when the parts are assembled and set, the flanged projection 11 will be firmly locked to the collar 13 and prevent any longitudinal or rotary movement of the parts relative to each other.

Adjacent the end 16 of the vent pipe 17 there is provided an outwardly projecting flange 18, which may be formed in any suitable manner, the end 16 entering the bushing 14, as shown, so as to telescope the vent projection 11.

A coupling nut 19 rotatably mounted on the pipe 17, is formed with an inwardly extending collar 20, which engages the flange 18, this nut 19 being threaded or otherwise formed so as to engage the exteriorly threaded or equivalently formed bushing 14. A packing 21 is preferably interposed between the lower side of the flange 18 and the flange 12 of the vent projection 11, so as to insure a fluid and gas tight joint when the parts are drawn together.

It will be observed that by reason of the end of the pipe section 17 telescoping the projection 11, the packing 21 is prevented from being forced inwardly when the coupling is set and a perfect encasement of the packing will be assured.

It will be understood that the packing 21 may be dispensed with, so as to provide a metal-to-metal joint with the flange of the pipe section, and that such a construction is contemplated as falling within the scope of the present invention.

It will be further observed that the flange 18 is a relatively wide open flange so as to provide means for filling up the bushing 14 vertically, and thus position the coupling nut 19 with its collar 20 properly with respect to the bushing 14 for the effective securing of the parts together, it being obvious that unless the flange 18 be extended in order to project above the top of the bushing 14, the nut 19 could not be effectively manipulated relative to the bushing.

In Figure 2, which shows the invention adapted to a straight trap section, the parts are identical with the construction shown in Figure 1 with the exception that the flange 22 is connected to the end of the pipe 23 by an inclined portion 24 instead of a horizontal flange. With this construction, a packing 25 may be used which, as shown, will lie wedged between the flange on the straight trap section 26 and the inclined wall 24 of the flanged pipe end 23. When the nut 27 is rotated to clamp the parts together, a very rigid and tight joint is provided, for it will be seen that the end of the pipe 23, at one side of the inclined section 24, takes its bearing on the inside of the vent flange 28, while the straight flange section 22 on the other side of the inclined portion 24 takes its bearing on the inside of the bushing 29 with the packing 25 held between the wall of the bushing and the inclined portion 24 of the flange.

In Figure 5, which shows a modified form of the invention, the construction is substantially the same as that disclosed in the other figures, with the exception that a pair of flattened flanges 30 and 31 are formed adjacent the end of the pipe section 32 so that when the coupling nut 33, which abuts against the flange 30 is engaged with the bushing 34, secured to the pipe section 35, in the manner previously described, the flange 31 is brought into contact with the corresponding flange 34 on the pipe section 35, so as to provide a metal-to-metal joint. In this construction, the packing may be dispensed with, and the necessary and efficient fluid tight connection secured by metal-to-metal contact of the flanges. The parts, however, in this construction are so arranged that should it become desirable to interpose a packing between the lower flange 31 of the pipe section 32 and the flange 36, the same could readily be inserted without in any way impairing the vent coupling.

While the form of the invention herewith shown and described embraces a preferred embodiment of the same, it is to be understood that the construction may be varied as to mechanical details without departing from the spirit of the invention and the scope of what is claimed.

We claim:

1. A solderless vent coupling for traps comprising inlet and outlet pipe sections, an integral flanged tubular portion extending from the wall of one of said sections at substantially right angles to the longitudinal axis of the pipe, a bushing having means projecting inward from its annular wall and engaged by said flanged projection, an integral flange extending from the other of said sections at an angle to the longitudinal axis thereof, and a coupling nut engaging said last mentioned flange and rotatable relative thereto detachably connected with said bushing.

2. A solderless vent coupling for traps, comprising inlet and outlet pipe sections, an integral flanged tubular portion extending from the wall of one of said sections at substantially right angles to the longitudinal axis of the pipe, a bushing having at one end an inwardly extending collar that is engaged by said flanged projection, an integral flange extending from the other of said sections at an angle to the longitudinal axis thereof, a coupling nut engaging said last mentioned flange and rotatable relative thereto detachably connected with said bushing, and a packing interposed between said flanges.

3. A solderless vent coupling for traps comprising inlet and outlet pipe sections, an integral flanged projection extending from the wall of one of said sections, a threaded bushing having an inwardly projecting collar interlocked with said flanged projection, means on said bushing engaging the wall of the pipe section to lock said bushing against rotation, an integral flange on the other of said sections in opposed relation to said first named flanged projection, and a coupling nut slidably and rotatably mounted on said last mentioned section and in engagement with the flange therein, said nut being detachably and adjustably engaged with said bushing.

4. A solderless vent coupling for traps comprising inlet and outlet pipe sections, an integral flanged projection extending from the curved wall of one of said sections, a threaded bushing having an inwardly projecting collar interlocked with said flanged projection, and provided with a curved recess in its end contacting with the outer wall of said section, the other of said sections provided with an integral flange in opposed relation to said flange projection, and a coupling nut slidably mounted on said last mentioned section and engaging the flange therein, said nut being detachably and adjustably engaged with said bushing.

5. A solderless vent coupling for traps comprising inlet and outlet pipe sections, an integral flanged projection extending from the curved wall of one of said sections, a threaded bushing having an inwardly projecting collar interlocked with said flanged projection, and provided with a curved recess in its end contacting with the outer wall of said section, the other of said sections provided with a relatively wide open flange, and a coupling nut rotatably secured to said open flange, and adjustably engaged with said bushing.

6. A solderless vent coupling for traps comprising inlet and outlet pipe sections, an integral flanged tubular projection extending laterally from the wall of one of said sections, a bushing non-rotatably secured to said flanged projection, and extending longitudinally beyond the outer end of said projection, the other of said sections provided with an outwardly extending flange formed in the wall thereof at a point removed from its end, and a coupling nut rotatably engaged with said last mentioned flange and detachably connected with said bushing.

7. A solderless coupling comprising a pipe section having an integral flanged projection formed in and extending laterally from the wall thereof, a bushing having an inwardly projecting collar interlocked with said projection, a second pipe section having an open flange projecting outwardly from the wall thereof at a point removed from its end, and a coupling nut in rotatable engagement with said last mentioned flange and detachably connected with said bushing.

8. A solderless coupling comprising a pipe section having an integral flanged tubular projection formed in the wall thereof, a bushing having an inwardly projecting collar interlocked with said projection, a second pipe section having an open flange projecting outwardly from the wall thereof at a point removed from its end, a packing interposed between said flanges, and a coupling nut in rotatable engagement with said last mentioned flange and detachably connected with said bushing.

9. A solderless coupling comprising a pipe section having an integral flanged tubular projection formed in its wall, a bushing having an inwardly projecting collar interlocked with said projection, a second pipe section having an integral outwardly projecting open flange at a point removed from its end fitted to the interior of said bushing, and a coupling nut rotatably engaged with said last mentioned flange and detachably connected with said bushing.

10. A solderless coupling comprising a pipe section having an integral flanged tubular projection formed in its wall, a bushing having an inwardly projecting collar interlocked with said projection, a second pipe section having an integral open outwardly projecting flange formed in its wall at a point removed from its end, said flange being fitted to the interior of said bushing with the end of said second pipe section fitted to the interior of the flanged projection in said first named pipe section, and a coupling nut rotatably engaged with said last mentioned flange and detachably connected with said bushing.

11. A solderless coupling comprising a pipe section having an integral flanged projection formed in and projecting laterally from its wall, a bushing having an inwardly projecting collar interlocked with said projection, a second pipe section having an integral open outwardly projecting flange formed in its wall at a point removed from its end, said flange being fitted to the interior of said bushing, with the end of said second pipe section fitted to the interior of the flanged projection of said first named pipe section, a packing within said bushing and between said last named flange and the flange on the projection on said first mentioned pipe section, and a coupling nut rotatably engaged with the flange on said second pipe section and detachably connected with said bushing.

12. A connection for a longitudinally curved thin pipe comprising an integral, open, flanged projection extending from the curved wall of the pipe at substantially a right angle to the longitudinal axis thereof, and a threaded bushing having an inwardly-projecting collar interlocked with said flanged projection and provided with a curved recess in its end to seat upon the pipe at the side of the projection.

13. A connection for uniting a longitudinally curved thin pipe with a main pipe comprising an integral flanged projection extending from the curved wall of the pipe at substantially a right angle to the longitudinal axis thereof, and a threaded bushing having an inwardly projecting collar interlocked with said flanged projection, said collar provided with means to engage the main pipe section and lock it against rotation.

In testimony whereof we have hereunto set our hands.

PHILIP MUELLER.
ANTON C. SCHUERMANN.
CLARENCE W. LUCAS.